(12) United States Patent
Park

(10) Patent No.: US 9,822,830 B2
(45) Date of Patent: Nov. 21, 2017

(54) METHOD AND APPARATUS FOR LEARNING LINEARITY ERROR OF HYDRAULIC PRESSURE SENSOR FOR HYDRAULIC CLUTCH

(71) Applicants: Hyundai Motor Company, Seoul (KR); Kia Motor Corporation, Seoul (KR)

(72) Inventor: Joonyoung Park, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 232 days.

(21) Appl. No.: 14/942,426

(22) Filed: Nov. 16, 2015

(65) Prior Publication Data

US 2017/0045104 A1 Feb. 16, 2017

(30) Foreign Application Priority Data

Aug. 13, 2015 (KR) .......................... 10-2015-0114650

(51) Int. Cl.
*F16D 48/06* (2006.01)
*G07C 5/08* (2006.01)
(Continued)

(52) U.S. Cl.
CPC ............ *F16D 48/066* (2013.01); *B62D 6/00* (2013.01); *G07C 5/0808* (2013.01); *B60K 6/387* (2013.01); *B60Y 2200/92* (2013.01); *B60Y 2300/182* (2013.01); *B60Y 2300/42* (2013.01); *B60Y 2400/406* (2013.01); *F16D 2300/18* (2013.01); *F16D 2500/1066* (2013.01); *F16D 2500/3024* (2013.01); *F16D 2500/3028* (2013.01); *F16D 2500/30808* (2013.01); *F16D 2500/3166* (2013.01); *F16D 2500/5018* (2013.01);
(Continued)

(58) Field of Classification Search
CPC . F16D 48/066; G07C 5/0808; Y10S 903/914; Y10S 903/946; B60K 6/387
See application file for complete search history.

(56) References Cited

U.S. PATENT DOCUMENTS 4,991,455 A * 2/1991 Bulgrien ............... B60W 10/02
701/51
5,004,084 A * 4/1991 Mehr-Ayin ........... F16D 48/066
192/103 F
(Continued)

FOREIGN PATENT DOCUMENTS

| JP | 2013-137061 A | 7/2013 |
| KR | 10-2014-0059613 A | 5/2014 |
| KR | 10-1519797 B1 | 5/2015 |

*Primary Examiner* — Mussa A Shaawat
(74) *Attorney, Agent, or Firm* — Brinks Gilson & Lione

(57) ABSTRACT

A method and an apparatus for learning linearity error of a hydraulic pressure sensor for a hydraulic clutch are disclosed. An apparatus for learning linearity error of a hydraulic pressure sensor for a hydraulic clutch may include: a gear stage sensor detecting a gear stage that is currently engaged; a controller executed by a predetermined program to learn the linearity error of the hydraulic pressure sensor based on signals of the gear stage sensor and the hydraulic pressure sensor; and a solenoid valve applying hydraulic pressure for learning the linearity error of the hydraulic pressure sensor to the hydraulic clutch based on a learning command of the controller.

21 Claims, 7 Drawing Sheets

(51) Int. Cl.
  *B62D 6/00*   (2006.01)
  *B60K 6/387*   (2007.10)

(52) U.S. Cl.
  CPC .............. *F16D 2500/70406* (2013.01); *F16D 2500/70673* (2013.01); *F16D 2500/70689* (2013.01); *Y10S 903/914* (2013.01); *Y10S 903/946* (2013.01)

(56) References Cited

U.S. PATENT DOCUMENTS

| | | | | |
|---|---|---|---|---|
| 5,690,581 | A * | 11/1997 | Nadayoshi | F16H 61/061 477/155 |
| 7,752,021 | B2 * | 7/2010 | Holtz | F16H 61/143 701/67 |
| 9,719,568 | B2 * | 8/2017 | Turner | F16D 48/066 |
| 2009/0118079 | A1 * | 5/2009 | Heap | B60W 50/04 477/3 |
| 2011/0278129 | A1 * | 11/2011 | Gorius | F16D 48/066 192/85.01 |
| 2014/0129104 | A1 | 5/2014 | Park | |
| 2014/0331739 | A1 * | 11/2014 | Moon | G01L 19/02 73/1.59 |
| 2016/0069402 | A1 * | 3/2016 | Chimner | F16D 48/066 701/67 |
| 2016/0195451 | A1 * | 7/2016 | Fujii | F16H 61/061 73/115.02 |

\* cited by examiner

METHOD AND APPARATUS FOR LEARNING LINEARITY ERROR OF HYDRAULIC PRESSURE SENSOR FOR HYDRAULIC CLUTCH

CROSS-REFERENCE TO RELATED APPLICATION

This application claims the benefit of Korean Patent Application No. 10-2015-0114650, filed on Aug. 13, 2015, which is incorporated herein by reference in its entirety.

FIELD

The present disclosure relates to a method and an apparatus for learning a linearity error of a hydraulic pressure sensor for a hydraulic clutch.

BACKGROUND

The statements in this section merely provide background information related to the present disclosure and may not constitute prior art.

A hybrid electric vehicle uses an internal combustion engine and a battery power source together. That is, the hybrid electric vehicle efficiently combines and uses torque of the internal combustion engine and torque of the motor.

In general, the hybrid electric vehicle includes an engine, a motor, an engine clutch selectively connecting the engine to the motor, a transmission, a differential gear device, a high voltage battery, a hybrid starter & generator (HSG) starting the engine or generating power according to output of the engine, and wheels. The HSG may refer to an integrated starter & generator (ISG).

The hybrid electric vehicle provides driving in an electric vehicle (EV) mode in which only torque of the motor is used; a hybrid electric vehicle (HEV) mode in which torque of the engine is used as main torque and torque of the motor is used as auxiliary torque, by engaging or releasing the engine clutch depending on acceleration intention and deceleration intention based on a manipulation of an accelerator pedal and a brake pedal by a driver, a vehicle speed, a state of charge (SOC) of the battery, and the like; and a regenerative braking mode in which braking and inertial energy are recovered through electrical power generation of the motor during braking of the vehicle or during deceleration of the vehicle by inertia to be charged in the battery.

Since the hybrid electric vehicle uses both mechanical energy of the engine and electrical energy of the battery, uses optimal operation regions of the engine and the motor, and recovers the energy upon braking, fuel efficiency may be improved and the energy may be efficiently used.

The engine clutch is engaged or released according to hydraulic pressure applied from a solenoid valve. A hydraulic pressure sensor is used to monitor the hydraulic pressure applied to the engine clutch. The hydraulic pressure applied to the engine clutch may be measured based on a voltage received from the hydraulic pressure sensor. As shown in FIG. 7, there is a linearity error in measured voltages of the hydraulic pressure sensor. We have discovered that if the linearity error of the hydraulic pressure sensor is not properly corrected, it is difficult to control the engagement degree of the engine clutch. Because power performance and fuel consumption of the hybrid electric vehicle are affected by the engagement degree of the engine clutch, a method for learning the linearity error of the hydraulic pressure sensor is requested.

SUMMARY

The present disclosure provides a method and an apparatus for learning a linearity error of a hydraulic pressure sensor for a hydraulic clutch having advantages of efficiently correcting the linearity error.

A method for learning a linearity error of a hydraulic pressure sensor for a hydraulic clutch according to an exemplary embodiment of the present disclosure may include: generating a learning command for learning the linearity error of the hydraulic pressure sensor; checking a measured hydraulic pressure based on a voltage received from the hydraulic pressure sensor; while generating the learning command corresponding to a first target hydraulic pressure between a first time point and a second time point at which a default period has passed from the first time point, checking a first maximum value and a first minimum value of the measured hydraulic pressure between a third time point at which a transition period has passed from the first time point and the second time point; comparing a first difference value between the first maximum value and the first minimum value with a threshold value; when the first difference value is greater than or equal to the threshold value, further generating the learning command corresponding to the first target hydraulic pressure after the second time point; if the learning command corresponding to the first target hydraulic pressure is further generated after the second time point, checking a second maximum value and a second minimum value of the measured hydraulic pressure for a predetermined time; comparing a second difference value between the second maximum value and the second minimum value with the threshold value; when the second difference value is less than the threshold value, calculating a moving average value of an error value between the first target hydraulic pressure and the measured hydraulic pressure for a time during which the learning command corresponding to the first target hydraulic pressure is further generated; and storing the moving average value as a correction value for correcting the linearity error of the hydraulic pressure sensor.

The method may further include stopping the generation of the learning command corresponding to the first target hydraulic pressure when the second difference value is less than the threshold value.

The method may further include: if the second difference value is greater than or equal to the threshold value, comparing an elapsed time after the second time point with a limit time; and if the elapsed time reaches the limit time, stopping the learning command corresponding to the first target hydraulic pressure, and not storing the moving average value of the error value between the first target hydraulic pressure and the measured hydraulic pressure for the time during which the learning command corresponding to the first target hydraulic pressure is further generated.

The method may further include, if the first difference value is less than the threshold value, storing the moving average value of the error value between the first target hydraulic pressure and the measured hydraulic pressure between the third time point and the second time point as the correction value.

The method may further include determining whether a learning entry condition is satisfied, wherein if the learning entry condition is satisfied, the generating of the learning command for learning the linearity error of the hydraulic pressure sensor may be performed.

The learning entry condition may be satisfied if a gear stage is a parking stage or a neutral stage.

The method may further include: determining whether a learning termination condition is satisfied; and if the learning termination condition is satisfied, not generating the learning command.

The learning termination condition may be satisfied if the gear stage is a driving stage or a reverse driving stage.

The moving average value Ma of the error value for the time during which the learning command corresponding the first target hydraulic pressure is further generated may be calculated by an equation of $$M_a = \sum_{i=1}^{n} (E_{k-n+i} \times W_i),$$

where Ek is an error value at a current time point, Ek−n+i is an error value at a k−n+i time point, and Wi is an i-th weight value.

A sum of the ne weight values may be 1, and the n weight values may satisfy a relation of Wi≤Wi+1.

A method for learning a linearity error of a hydraulic pressure sensor for a hydraulic clutch according to another exemplary embodiment of the present disclosure may include: generating a learning command for learning the linearity error of the hydraulic pressure sensor; checking a measured hydraulic pressure based on a voltage received from the hydraulic pressure sensor; while generating the learning command corresponding to a first target hydraulic pressure between a first time point and a second time point at which a default period has passed from the first time point, checking a first maximum value and a first minimum value of the measured hydraulic pressure between a third time point at which a transition period has passed from the first time point and the second time point; comparing a first difference value between the first maximum value and the first minimum value with a threshold value; if the first difference value is greater than or equal to the threshold value, further generating the learning command corresponding to the first target hydraulic pressure between the second time point and a fourth time point at which an extended period has passed from the second time point; checking a second maximum value and a second minimum value of the measured hydraulic pressure between the second time point and the fourth time point; comparing a second difference value between the second maximum value and the second minimum value with the threshold value; if the second difference value is less than the threshold value, calculating a moving average value of an error value between the first target hydraulic pressure and the measured hydraulic pressure between the second time point and the fourth time point; and storing the moving average value as a correction value for correcting the linearity error of the hydraulic pressure sensor.

The method may further include, if the second difference value is greater than or equal to the threshold value, not storing the moving average value of the error value between the first target hydraulic pressure and the measured hydraulic pressure between the second time point and the fourth time point as the correction value.

The method may further include, if the first difference value is less than the threshold value, storing the moving average value of the error value between the first target hydraulic pressure and the measured hydraulic pressure between the third time point and the second time point as the correction value.

The method may further include determining whether a learning entry condition is satisfied, wherein if the learning entry condition is satisfied, the generation of the learning command for learning the linearity error of the hydraulic pressure sensor may be performed.

The learning entry condition may be satisfied if a gear stage is a parking stage or a neutral stage.

The method may further include: determining whether a learning termination condition is satisfied; and if the learning termination condition is satisfied, not generating the learning command.

The learning termination condition may be satisfied if the gear stage is a driving stage or a reverse driving stage.

The moving average value Mb of the error value between the first target hydraulic pressure and the measured hydraulic pressure between the second time point and the fourth time point may be calculated by an equation of $$M_b = \sum_{i=1}^{m} (E_{t4b-m+i} \times W_i),$$

where Et4b−m+i is an error value at a t4b−m+i time point and Wi is an i-th weight value.

A sum of the m weight values is 1, and the m weight values satisfy a relation of Wi≤Wi+1.

An apparatus for learning a linearity error of a hydraulic pressure sensor for a hydraulic clutch according to an exemplary embodiment of the present disclosure may include: a gear stage sensor detecting a gear stage that is currently engaged; a controller executed by a predetermined program to learn the linearity error of the hydraulic pressure sensor based on signals of the gear stage sensor and the hydraulic pressure sensor; and a solenoid valve applying hydraulic pressure for learning the linearity error of the hydraulic pressure sensor to the hydraulic clutch based on a learning command of the controller.

Although the measured hydraulic pressure is dramatically changed due to an erroneous operation of the hydraulic pressure supply system including the solenoid valve, it is possible to accurately correct the linearity error of the hydraulic pressure sensor by controlling the learning time.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
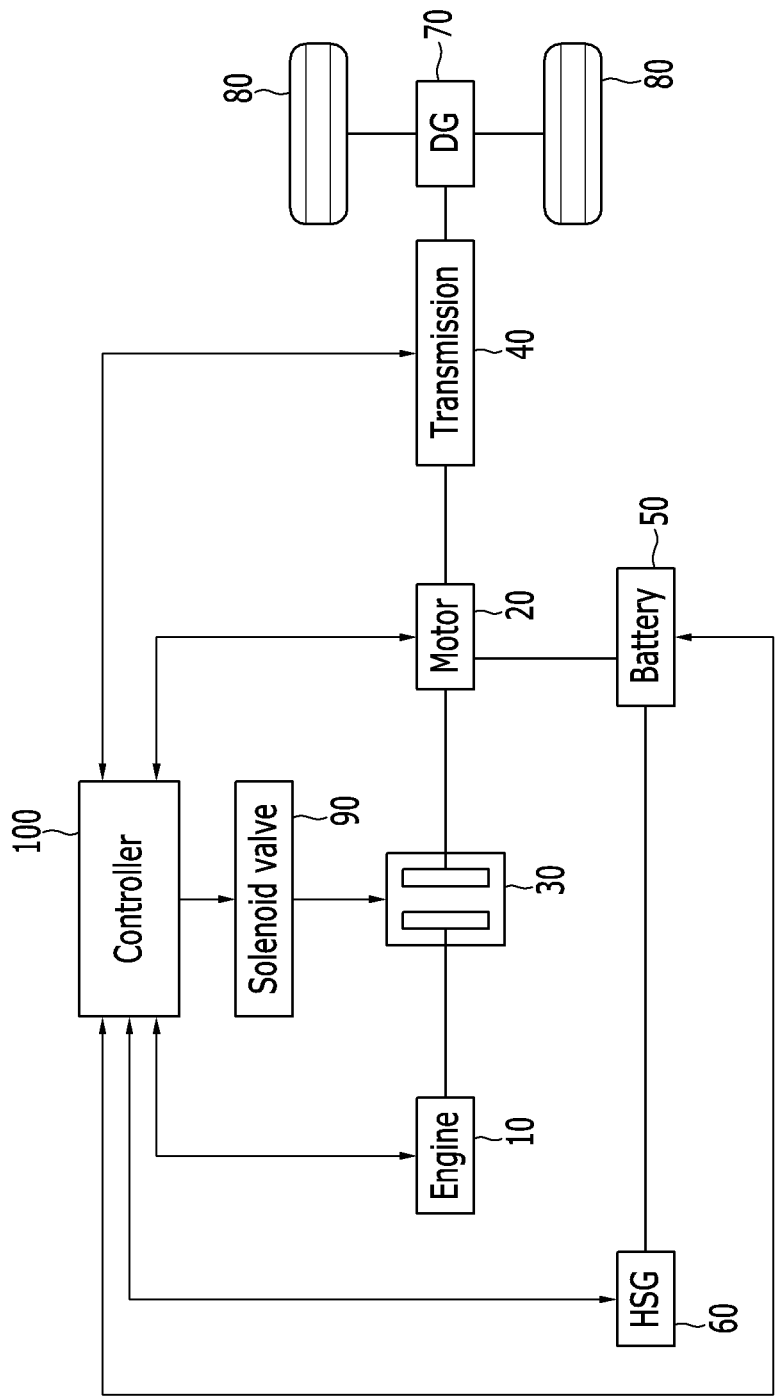
FIG. 1 is a block diagram illustrating a configuration of a hybrid electric vehicle.

The drawings described herein are for illustration purposes only and are not intended to limit the scope of the present disclosure in any way.

<Description of symbols>

| | |
|---|---|
| 10: engine | 20: motor |
| 30: engine clutch | 40: transmission |
| 50: battery | 60: HSG |
| 70: differential gear device | 80: wheel |
| 90: solenoid valve | 100: controller |
| 110: gear stage sensor | 120: hydraulic pressure sensor |

DETAILED DESCRIPTION

The following description is merely exemplary in nature and is not intended to limit the present disclosure, application, or uses. It should be understood that throughout the drawings, corresponding reference numerals indicate like or corresponding parts and features.

In the following description, dividing names of components into first, second, and the like is to divide the names because the names of the components are the same as each other and an order thereof is not particularly limited.

FIG. 1 is a block diagram illustrating a configuration of a hybrid electric vehicle.

As shown in FIG. 1, a hybrid electric vehicle may include an engine 10, a motor 20, an engine clutch 30, a transmission 40, a battery 50, a hybrid starter & generator (HSG) 60, a differential gear device 70, a wheel 80, a solenoid valve 90, and a controller 100.

The engine 10 combusts a fuel to generate torque, and various engines such as a gasoline engine, a diesel engine, and an LPI engine may be used as the engine 10.

In connection with torque transmission of the hybrid electric vehicle, torque generated from the engine 10 and/or the motor 20 is selectively transmitted to an input shaft of the transmission 40, and torque output from an output shaft of the transmission 40 is transmitted to an axle via the differential gear device 70. The axle rotates the wheel 80 so that the hybrid electric vehicle runs by the torque generated from the engine 10 and/or motor 20.

The battery 50 may supply electricity to the motor 20 in an electric vehicle (EV) mode and a hybrid electric vehicle (HEV) mode, and may be charged with electricity recovered through the motor 20 in a regenerative braking mode.

The HSG 60 starts the engine 10 or generates electricity according to an output of the engine 10.

The engine clutch 30 may be disposed between the engine 10 and the motor 20, and may selectively connect the engine 10 to the motor 20. An input shaft of the engine clutch 30 is connected to the engine 10, and an output shaft of the engine clutch 30 is connected to the motor 20. The engine clutch 30 is engaged in the HEV mode and is released in the EV mode.

The solenoid valve 90 applies hydraulic pressure to the engine clutch 30 according to a hydraulic pressure command of the controller 10. As the hydraulic pressure applied to the engine clutch 30 is increased, the torque transmitted by the engine clutch 30 is increased.

The controller 100 controls switching between the EV mode and the HEV mode based on driving conditions of the hybrid electric vehicle.

Figure 2:
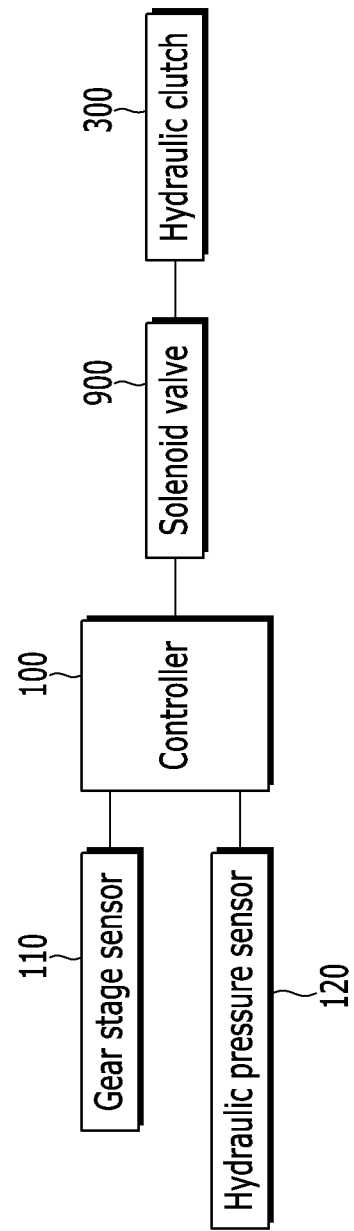
FIG. 2 is a block diagram illustrating an apparatus for learning a linearity error of a hydraulic pressure sensor for a hydraulic clutch.

FIG. 2 is a block diagram illustrating an apparatus for learning a linearity error of a hydraulic pressure sensor for a hydraulic clutch according to an exemplary embodiment of the present disclosure.

As shown in FIG. 2, an apparatus for learning a linearity error of a hydraulic pressure sensor for a hydraulic clutch may include a gear stage sensor 110, a hydraulic pressure sensor 120, a controller 100, and a solenoid valve 900.

The gear stage sensor 110 detects a gear stage that is currently engaged, and transmits a signal corresponding thereto to the controller 100.

The hydraulic pressure sensor 120 detects hydraulic pressure applied to a hydraulic clutch 300, and transmits a signal corresponding thereto to the controller 100. The hydraulic clutch 300 may be a clutch which is engaged or released based on hydraulic pressure applied from the solenoid valve 900, and the engine clutch 30 is exemplified as the hydraulic clutch 300 herein, but the present disclosure is not limited thereto. In the present specification, it is to be understood that the hydraulic clutch 300 may include any clutch that can be operated based on hydraulic pressure applied from the solenoid value 900.

The controller 100 may be implemented with one or more microprocessors executed by a predetermined program. The predetermined program may include a series of commands for performing each step included in a method of controlling a hydraulic pressure sensor for a hydraulic clutch according to an exemplary embodiment of the present disclosure.

The solenoid valve 900 may applies hydraulic pressure for learning a linearity error of the hydraulic pressure sensor 120 to the hydraulic clutch 300 depending on a learning command of the controller 100. The solenoid valve 900 is exemplified as the solenoid valve 90 applying hydraulic pressure to the engine clutch 30 herein, but the present disclosure is not limited thereto.

Hereinafter, the engine clutch 30 will be exemplified as the hydraulic clutch 300, and a method for learning a linearity error of a hydraulic pressure sensor for a hydraulic clutch will be described in detail with reference to FIG. 3 to FIG. 6

Figure 3:
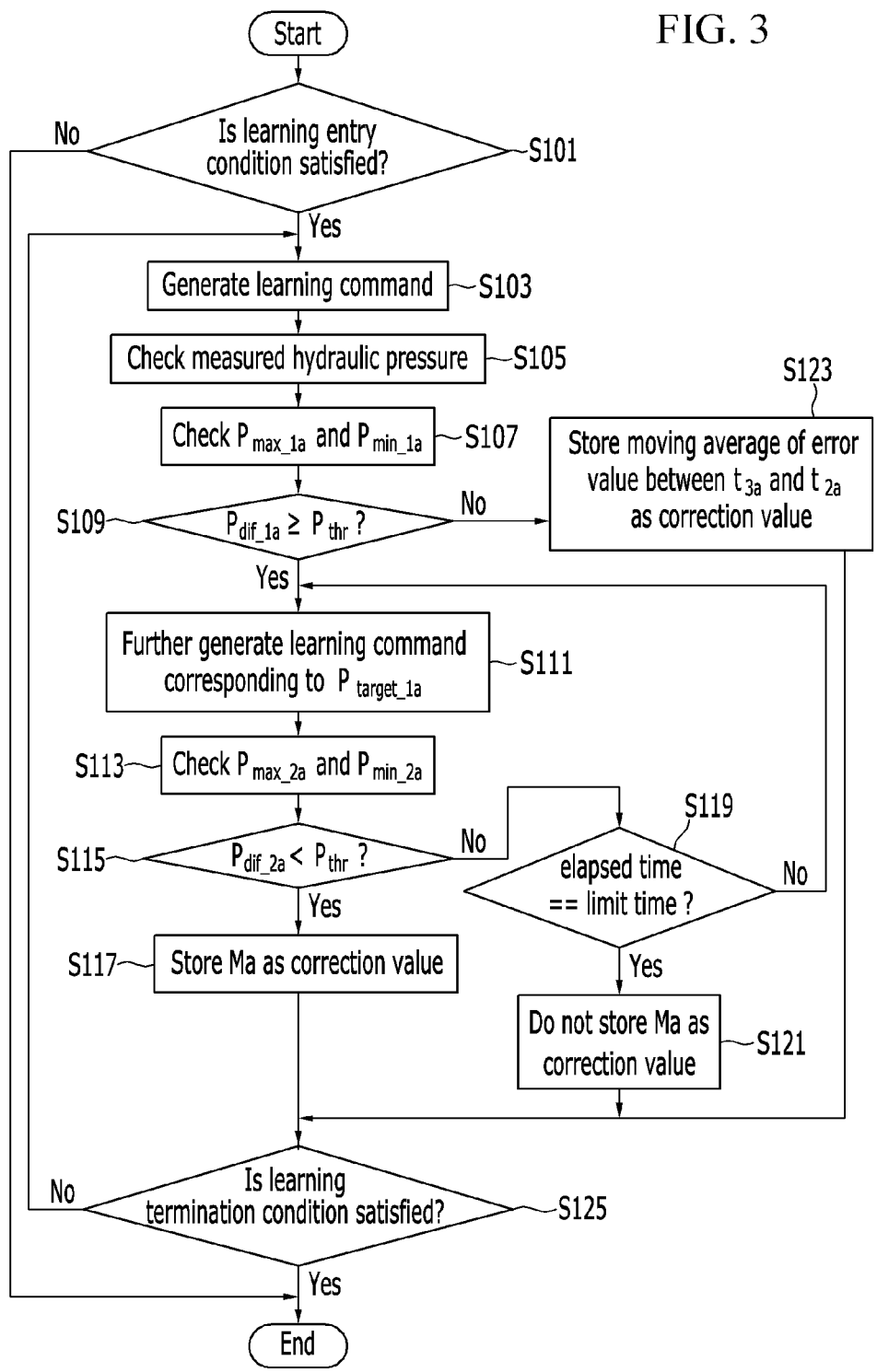
FIG. 3 is a flowchart illustrating a method for learning a linearity error of a hydraulic pressure sensor for a hydraulic clutch.
Figure 4:
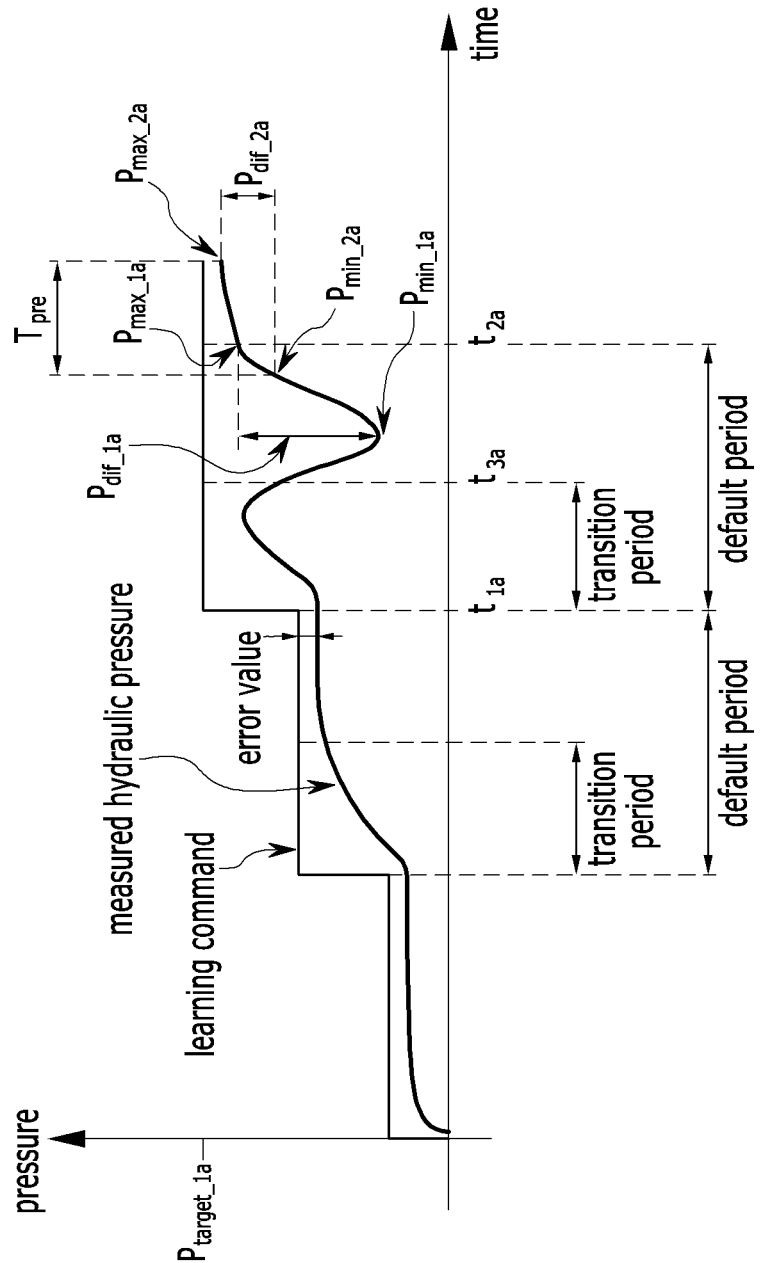
FIG. 4 is a graph for explaining a method for learning a linearity error of a hydraulic pressure sensor for a hydraulic clutch.

FIG. 3 is a flowchart illustrating a method for learning a linearity error of a hydraulic pressure sensor for a hydraulic clutch, and FIG. 4 is a graph for explaining a method for learning a linearity error of a hydraulic pressure sensor for a hydraulic clutch.

Referring to FIG. 3 and FIG. 4, a method for learning a linearity error of a hydraulic pressure sensor begins with determining whether a learning entry condition is satisfied in step S101. The learning entry condition may be satisfied if the gear stage is a parking stage (P-stage) or a neutral stage (N-stage). When the gear stage is the parking stage or the neutral stage, the controller 100 may determine that the engine 10 and the motor 20 are in a no-load state, that is, the driving of the hybrid electric vehicle is not influenced by the engagement of the engine clutch 30.

If the learning entry condition is not satisfied in step S101, the controller 100 terminates the process for learning the linearity error of the hydraulic pressure sensor.

If the learning entry condition is satisfied in step S101, the controller 100 generates a learning command for learning the linearity error of the hydraulic pressure sensor 120 in step S103. For example, the controller 100 may generate the learning command that is increased stepwise. In other words, the learning command having different target hydraulic pressures may be sequentially generated so as to correct the linearity error of the hydraulic pressure sensor 120 for every default period. In addition, the controller 100 may generate the learning command having a target hydraulic pressure different from a target hydraulic pressure which was generated in a previous learning process.

The controller 100 checks a measured hydraulic pressure based on a voltage received from the hydraulic pressure sensor 120 in step S105.

While generating the learning command corresponding to a first target hydraulic pressure Ptarget_1a between a first time point t1a and a second time point t2a at which the default period has elapsed, the controller 100 checks a first maximum value Pmax_1a and a first minimum value Pmin_1a of the measured hydraulic pressure between a third time point t3a at which a transition period has passed from the first time point t1a and the second time point t2a in step S107. The transition period may be set by a person of ordinary skill in the art in consideration of a time required for the measured hydraulic pressure to follow the learning command.

The controller 100 calculates a first difference value Pdif_1a between the first maximum value Pmax_1a and the first minimum value Pmin_1a, and compares the first difference value Pdif_1a with a threshold value Pthr in step S109. The threshold value Pthr may be set to determine whether a hydraulic pressure leakage phenomenon due to an erroneous operation of a hydraulic pressure supply system including the solenoid valve 900 has occurred.

If the first difference value Pdif_1a is greater than or equal to the threshold value Pthr in step S109, the controller 100 further generates the learning command corresponding to the first target hydraulic pressure Ptarget_1a after the second time point t2a in step S111.

If the learning command corresponding to the first target hydraulic pressure Ptarget_1a is further generated after the second time point t2a, the controller 100 checks a second maximum value Pmax_2a and a second minimum value Pmin_2a of the measured hydraulic pressure for a predetermined time Tpre in step S113. The predetermined time Tpre may be set to determine whether the hydraulic pressure applied to the engine clutch 30 is stable.

The controller 100 calculates a second difference value Pdif_2a between the second maximum value Pmax_2a and the second minimum value Pmin_2a, and compares the second difference value Pdif_2a with the threshold value Pthr in step S115.

If the second difference value Pdif_2a is less than the threshold value Pthr in step S115, the controller 100 stores a moving average value Ma of an error value between the first target hydraulic pressure Ptarget_1a and the measured hydraulic pressure for a time during which the learning command corresponding to the first target hydraulic pressure Ptarget_1a is further generated as a correction value for correcting the linearity error of the hydraulic pressure sensor 120 in step S117. In this case, the controller 100 may stop the generation of the learning command corresponding to the first target hydraulic pressure Ptarget_1a.

In detail, the controller 100 may calculate the moving average value Ma of the error value for the time during which the learning command corresponding to the first target hydraulic pressure Ptarget_1a is further generated based on n error values and n weight values for the time during which the learning command corresponding to the first target hydraulic pressure Ptarget_1a is further generated. The moving average value Ma of the error value may be calculated by the following equation.

$$M_a = \sum_{i=1}^{n} (E_{k-n+i} \times W_i)$$

In the above equation, Ek is the error value at a current time point (k time point), Ek−n+i is the error value at a k−n+i time point, and Wi is an i-th weight value.

A sum of the n weight values W1 to Wn is 1, and an i-th weight value may be less than or equal to an (i+1)-th weight value (i.e., Wi≤Wi+1). The (i+1)-th weight value is set to be greater than or equal to the i-th weight value, and thus the latest error value has the greatest effect on the moving average value Ma of the error value.

Accordingly, the controller 100 may correct the linearity error of the hydraulic pressure sensor 120 based on the learning command corresponding to different target hydraulic pressures and correction values corresponding thereto.

If the second difference value Pdif_2a is greater than or equal to the threshold value Pthr in step S115, the controller 100 may compare an elapsed time after the second time point t2a with a limit time in step S119. The limit time may be set to prevent a learning time from being increased.

If the elapsed time is less than the limit time in step S119, the controller 100 repeats steps S111 to S115.

If the elapsed time reaches the limit time in step S119, the controller 100 terminates the generation of the learning command corresponding to the first target hydraulic pressure Ptarget_1a and does not store the moving average value Ma of the error value for the time during which the learning command corresponding to the first target hydraulic pressure Ptarget_1a is further generated as the correction value for correcting the linearity error of the hydraulic pressure sensor 120 in step S121. In other words, the moving average value Ma of the error value for the limit time is not used in the current learning process.

Meanwhile, if the first difference value Pdif_1a is less than the threshold value Pthr in step S109, the controller 100 stores the moving average value of the error value between the first target hydraulic pressure Ptarget_1a and the measured hydraulic pressure between the third time point t3a and the second time point t2a as the correction value for correcting the linearity error of the hydraulic pressure sensor 120 in step S123. The controller 100 may calculate the moving average value of the error value between the third time point t3a and the second time point t2a by the same method as the method of calculating the moving average value Ma of the error value.

Meanwhile, while performing the learning process, the controller 100 may determine whether a learning termination condition is satisfied in step S125. The learning termination condition may be satisfied if the gear stage is a driving stage (D-stage) or a reverse driving stage (R-stage).

If the learning termination condition is not satisfied in step S125, the controller 100 may continuously perform steps S103 to S123.

If the learning termination condition is satisfied in step S125, the controller 100 may terminate the process for learning the linearity error of the hydraulic pressure sensor according to an exemplary embodiment of the present disclosure. In this case, the controller 100 may not generate the learning command, and may determine whether to engage the engine clutch 30 based on a demand torque of a driver.

Figure 5:
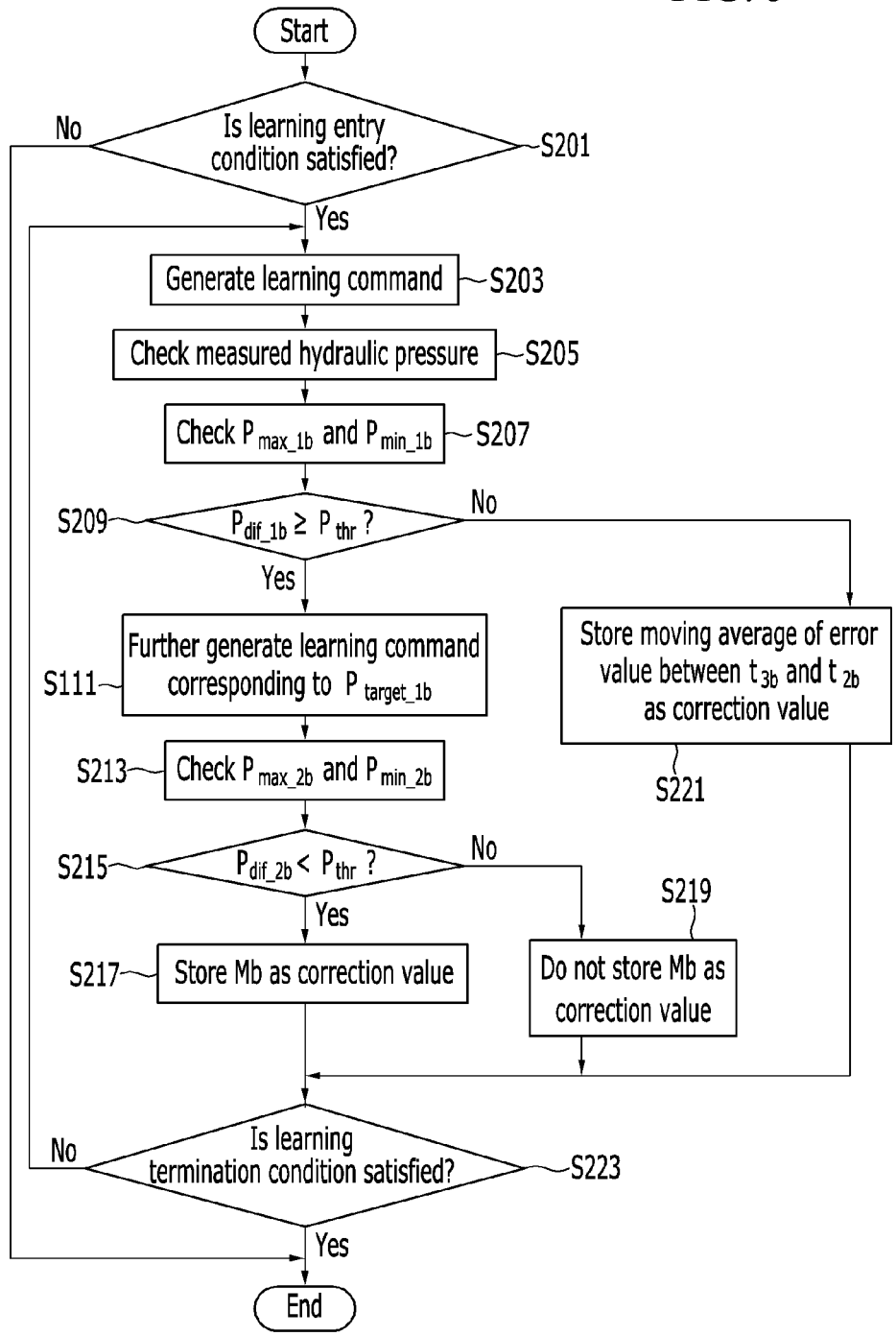
FIG. 5 is a flowchart illustrating a method for learning a linearity error of a hydraulic pressure sensor for a hydraulic clutch.
Figure 6:
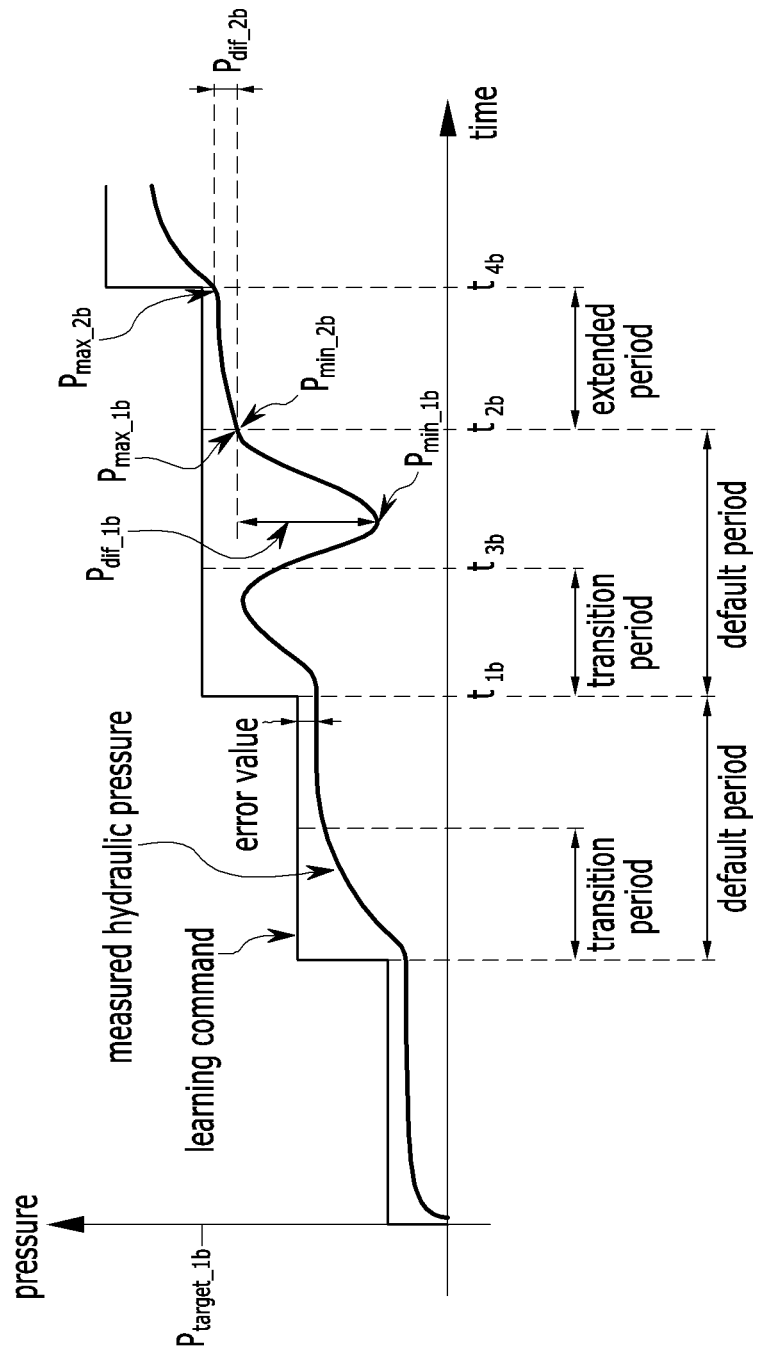
FIG. 6 is a graph for explaining a method for learning a linearity error of a hydraulic pressure sensor for a hydraulic clutch.
Figure 7:
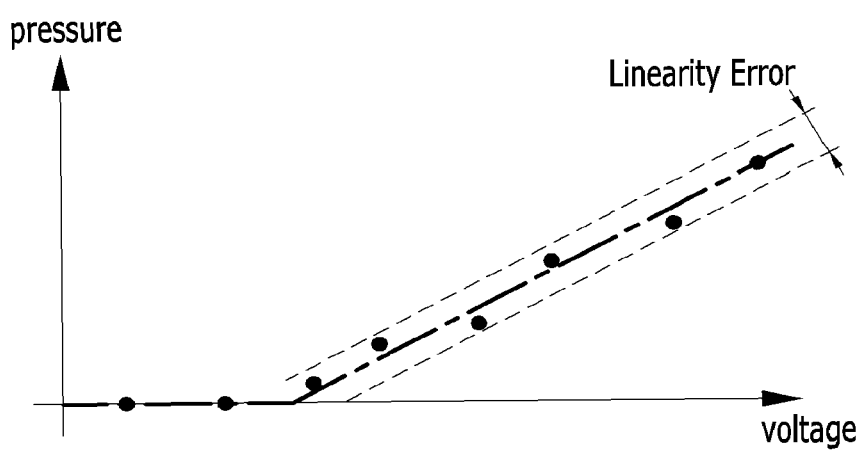
FIG. 7 is a graph illustrating a linearity error of a hydraulic pressure sensor for an engine clutch according to the related art.

FIG. 5 is a flowchart illustrating a method for learning a linearity error of a hydraulic pressure sensor for a hydraulic clutch according to the present disclosure, and FIG. 6 is a graph for explaining a method for learning a linearity error of a hydraulic pressure sensor for a hydraulic clutch according to the present disclosure.

Referring to FIG. 5 and FIG. 6, a method for learning a linearity error of a hydraulic pressure sensor begins with determining whether a learning entry condition is satisfied in step S201. The learning entry condition may be satisfied if the gear stage is a parking stage (P-stage) or a neutral stage (N-stage). When the gear stage is the parking stage or the neutral stage, the controller 100 may determine that the engine 10 and the motor 20 are in a no-load state, that is, the driving of the hybrid electric vehicle is not influenced by the engagement of the engine clutch 30.

If the learning entry condition is not satisfied in step S201, the controller 100 terminates the process for learning the linearity error of the hydraulic pressure sensor.

If the learning entry condition is satisfied in step S201, the controller 100 generates a learning command for learning the linearity error of the hydraulic pressure sensor 120 in step S203. For example, the controller 100 may generate the learning command that is increased stepwise. In other words, the learning command having different target hydraulic pressures may be sequentially generated so as to correct the linearity error of the hydraulic pressure sensor 120 for every default period. In addition, the controller 100 may generate the learning command having a target hydraulic pressure different from a target hydraulic pressure which was generated in a previous learning process.

The controller 100 checks a measured hydraulic pressure based on a voltage received from the hydraulic pressure sensor 120 in step S205.

While generating the learning command corresponding to a first target hydraulic pressure Ptarget_1b between a first time point t1b and a second time point t2b at which the default period has elapsed, the controller 100 checks a first maximum value Pmax_1b and a first minimum value Pmin_1b of the measured hydraulic pressure between a third time point t3b at which a transition period has passed after the first time point t1b and the second time point t2b in step S207. The transition period may be set in consideration of a time required for the measured hydraulic pressure to follow the learning command.

The controller 100 calculates a first difference value Pdif_1b between the first maximum value Pmax_1b and the first minimum value Pmin_1b, and compares the first difference value Pdif_1b with a threshold value Pthr in step S209. The threshold value Pthr may be set to determine whether a hydraulic pressure leakage phenomenon due to an erroneous operation of a hydraulic pressure supply system including the solenoid valve 900 has occurred.

If the first difference value Pdif_1b is greater than or equal to the threshold value Pthr in step S209, the controller 100 further generates the learning command corresponding to the first target hydraulic pressure Ptarget_1b between a second time point t2b and a fourth time point t4b at which an extended period has passed from the second time point t2b in step S211. The extended period may be set in consideration of a time required for the hydraulic pressure applied to the engine clutch 30 to be stabilized by removing the hydraulic pressure leakage phenomenon.

The controller 100 checks a second maximum value Pmax_2b and a second minimum value Pmin_2b of the measured hydraulic pressure between the second time point t2b and the fourth time point t4b in step S213.

The controller 100 calculates a second difference value Pdif_2b between the second maximum value Pmax_2b and the second minimum value Pmin_2b, and compares the second difference value Pdif_2b with the threshold value Pthr in step S215.

If the second difference value Pdif_2b is less than the threshold value Pthr in step S215, the controller 100 stores a moving average value Mb of an error value between the first target hydraulic pressure Ptarget_1b and the measured hydraulic pressure between the second time point t2b and the fourth time point t4b as a correction value for correcting the linearity error of the hydraulic pressure sensor 120 in step S217.

In detail, the controller 100 may calculate the moving average value Mb of the error value between the second time point t2b and the fourth time point t4b based on m error values and m weight values between the second time point t2b and the fourth time point t4b. The moving average value Mb of the error value may be calculated by the following equation.

$$M_b = \sum_{i=1}^{m} (E_{t4b-m+i} \times W_i)$$

In the above equation, Et4b−m+i is the error value at a t4b−m+i time point, and Wi is an i-th weight value.

A sum of the m weight values W1 to Wm is 1, and an i-th weight value may be less than or equal to an (i+1)-th weight value (i.e., Wi≤Wi+1). The (i+1)-th weight value is set to be greater than or equal to the i-th weight value, and thus the latest error value has the greatest effect on the moving average value Mb of the error value.

Accordingly, the controller 100 may correct the linearity error of the hydraulic pressure sensor 120 based on the learning command corresponding to different target hydraulic pressures and correction values corresponding thereto.

If the second difference value Pdif_2b is greater than or equal to the threshold value Pthr in step S215, the controller 100 does not store the moving average value Mb of the error value between the second time point t2b and the fourth time point t4b as the correction value for correcting the linearity error of the hydraulic pressure sensor 120 in step S219. In other words, the moving average value Mb of the error value for the time between the second timing t2b and the fourth timing t4b is not used in the preset learning process.

Meanwhile, if the first difference value Pdif_1b is less than the threshold value Pthr in step S209, the controller 100 stores the moving average value of the error value between the first target hydraulic pressure Ptarget_1b and the measured hydraulic pressure between the third time point t3b and the second time point t2b as the correction value for correcting the linearity error of the hydraulic pressure sensor 120 in step S221. The controller 100 may calculate the moving average value of the error value between the third time point t3b and the second time point t2b by the same method as the method of calculating the moving average value Mb of the error value.

Meanwhile, while performing the learning process, the controller 100 may determine whether a learning termination condition is satisfied in step S223. The learning termination condition may be satisfied if the gear stage is a driving stage (D-stage) or a reverse driving stage (R-stage).

If the learning termination condition is not satisfied in step S223, the controller 100 continuously performs steps S203 to S221.

If the learning termination condition is satisfied in step S215, the controller 100 may terminate the method for learning the linearity error of the hydraulic pressure sensor according to another exemplary embodiment of the present disclosure. In this case, the controller 100 may not generate the learning command, and may determine whether to engage the engine clutch 30 based on a demand torque of a driver.

As described above, although the measured hydraulic pressure is dramatically changed due to an erroneous operation of the hydraulic pressure supply system including the solenoid valve 900, it is possible to accurately correct the linearity error of the hydraulic pressure sensor 120 by controlling the learning time.

While this present disclosure has been described in connection with what is presently considered to be practical exemplary embodiments, it is to be understood that the present disclosure is not limited to the disclosed embodiments, but, on the contrary, is intended to cover various modifications and equivalent arrangements included within the spirit and scope of the appended claims.

What is claimed is:

1. A method for learning a linearity error of a hydraulic pressure sensor for a hydraulic clutch, comprising:
    generating a learning command by a controller for learning the linearity error of the hydraulic pressure sensor;
    checking by the controller a measured hydraulic pressure based on a voltage received from the hydraulic pressure sensor;
    while generating the learning command corresponding to a first target hydraulic pressure between a first time point and a second time point at which a default period has passed from the first time point, checking by the controller a first maximum value and a first minimum value of the measured hydraulic pressure between a third time point at which a transition period has passed from the first time point and the second time point;
    comparing by the controller a first difference value between the first maximum value and the first minimum value with a threshold value;
    when the first difference value is greater than or equal to the threshold value, generating the learning command corresponding to the first target hydraulic pressure after the second time point;
    when the learning command corresponding to the first target hydraulic pressure is generated after the second time point, checking by the controller a second maximum value and a second minimum value of the measured hydraulic pressure for a predetermined time;
    comparing a second difference value between the second maximum value and the second minimum value with the threshold value; and
    when the second difference value is less than the threshold value, calculating a moving average value of an error value between the first target hydraulic pressure and the measured hydraulic pressure for a time during which the learning command corresponding to the first target hydraulic pressure is further generated, and storing the moving average value as a correction value for correcting the linearity error of the hydraulic pressure sensor.

2. The method according to claim 1, further comprising stopping the generation of the learning command corresponding to the first target hydraulic pressure when the second difference value is less than the threshold value.

3. The method according to claim 1, further comprising:
    comparing an elapsed time after the second time point with a limit time when the second difference value is greater than or equal to the threshold value,; and
    when the elapsed time reaches the limit time, stopping the learning command corresponding to the first target hydraulic pressure, and not storing the moving average value of the error value between the first target hydraulic pressure and the measured hydraulic pressure for the time during which the learning command corresponding to the first target hydraulic pressure is further generated.

4. The method according to claim 1, further comprising, when the first difference value is less than the threshold value, storing the moving average value of the error value between the first target hydraulic pressure and the measured hydraulic pressure between the third time point and the second time point as the correction value.

5. The method according to claim 1, further comprising determining whether a learning entry condition is satisfied,
    wherein when the learning entry condition is satisfied, the generating of the learning command for learning the linearity error of the hydraulic pressure sensor is performed.

6. The method according to claim 5, wherein the learning entry condition is satisfied when a gear stage is a parking stage or a neutral stage.

7. The method according to claim 5, further comprising:
    determining whether a learning termination condition is satisfied; and
    when the learning termination condition is satisfied, refraining from generating the learning command.

8. The method according to claim 7, wherein the learning termination condition is satisfied when the gear stage is a driving stage or a reverse driving stage.

9. The method according to claim 1, wherein the moving average value Ma of the error value for the time during which the learning command corresponding to the first target hydraulic pressure is further generated is calculated by an equation of $$M_a = \sum_{i=1}^{n} (E_{k-n+i} \times W_i),$$

where $E_k$ is an error value at a current time point, $E_{k-n+i}$ is an error value at a k−n+i time point, and $W_i$ is an i-th weight value.

10. The method according to claim 9, wherein a sum of the n weight values is 1, and the n weight values satisfy a relation of $W_i \leq W_{i+1}$.

11. A method for learning a linearity error of a hydraulic pressure sensor for a hydraulic clutch, comprising:
    generating by a controller a learning command for learning the linearity error of the hydraulic pressure sensor;
    checking by the controller a measured hydraulic pressure based on a voltage received from the hydraulic pressure sensor;
    while generating the learning command corresponding to a first target hydraulic pressure between a first time point and a second time point at which a default period has passed from the first time point, checking by the controller a first maximum value and a first minimum value of the measured hydraulic pressure between a third time point at which a transition period has passed from the first time point and the second time point;

comparing by the controller a first difference value between the first maximum value and the first minimum value with a threshold value;

when the first difference value is greater than or equal to the threshold value, further generating the learning command corresponding to the first target hydraulic pressure between the second time point and a fourth time point at which an extended period has passed from the second time point;

checking by the controller a second maximum value and a second minimum value of the measured hydraulic pressure between the second time point and the fourth time point;

comparing by the controller a second difference value between the second maximum value and the second minimum value with the threshold value; and when the second difference value is less than the threshold value, calculating by the controller a moving average value of an error value between the first target hydraulic pressure and the measured hydraulic pressure between the second time point and the fourth time point, and storing the moving average value as a correction value for correcting the linearity error of the hydraulic pressure sensor.

12. The method according to claim 11, further comprising, when the second difference value is greater than or equal to the threshold value, refraining from storing the moving average value of the error value between the first target hydraulic pressure and the measured hydraulic pressure between the second time point and the fourth time point as the correction value.

13. The method according to claim 11, further comprising, when the first difference value is less than the threshold value, storing the moving average value of the error value between the first target hydraulic pressure and the measured hydraulic pressure between the third time point and the second time point as the correction value.

14. The method according to claim 11, further comprising determining whether a learning entry condition is satisfied,
wherein when the learning entry condition is satisfied, the generating of the learning command for learning the linearity error of the hydraulic pressure sensor is performed.

15. The method according to claim 14, wherein the learning entry condition is satisfied when a gear stage is a parking stage or a neutral stage.

16. The method according to claim 14, further comprising:
determining whether a learning termination condition is satisfied; and
when the learning termination condition is satisfied, not generating the learning command.

17. The method according to claim 16, wherein the learning termination condition is satisfied when the gear stage is a driving stage or a reverse driving stage.

18. The method according to claim 11, wherein the moving average value Mb of the error value between the first target hydraulic pressure and the measured hydraulic pressure between the second time point and the fourth time point is calculated by an equation of $$M_b = \sum_{i=1}^{m} (E_{t4b-m+i} \times W_i),$$

where $E_{t4b-m+i}$ is an error value at a $t4b-m+i$ time point and $W_i$ is an i-th weight value.

19. The method according to claim 18, wherein a sum of the m weight values is 1, and the m weight values satisfy a relation of $W_i \leq W_{i+1}$.

20. An apparatus for learning a linearity error of a hydraulic pressure sensor for a hydraulic clutch, comprising:
a gear stage sensor configured to detect a gear stage that is currently engaged;
a controller configured to execute a predetermined program to learn the linearity error of the hydraulic pressure sensor based on signals of the gear stage sensor and the hydraulic pressure sensor; and
a solenoid valve configured to apply hydraulic pressure for learning the linearity error of the hydraulic pressure sensor to the hydraulic clutch based on a learning command of the controller,
wherein when executing the predetermined program the controller is configured to:
generate the learning command for learning the linearity error of the hydraulic pressure sensor;
check a measured hydraulic pressure based on a voltage received from the hydraulic pressure sensor;
while generating the learning command corresponding to a first target hydraulic pressure between a first time point and a second time point at which a default period has passed from the first time point, check a first maximum value and a first minimum value of the measured hydraulic pressure between a third time point at which a transition period has passed from the first time point and the second time point;
compare a first difference value between the first maximum value and the first minimum value with a threshold value;
when the first difference value is greater than or equal to the threshold value, generate the learning command corresponding to the first target hydraulic pressure after the second time point;
when the learning command corresponding to the first target hydraulic pressure is further generated after the second time point, check a second maximum value and a second minimum value of the measured hydraulic pressure for a predetermined time;
compare a second difference value between the second maximum value and the second minimum value with the threshold value; and
when the second difference value is less than the threshold value, calculate a moving average value of an error value between the first target hydraulic pressure and the measured hydraulic pressure for a time during which the learning command corresponding to the first target hydraulic pressure is further generated, and store the moving average value as a correction value for correcting the linearity error of the hydraulic pressure sensor.

21. An apparatus for learning a linearity error of a hydraulic pressure sensor for a hydraulic clutch, comprising:
a gear stage sensor configured to detect a gear stage that is currently engaged;
a controller configured to execute a predetermined program to learn the linearity error of the hydraulic pressure sensor based on signals of the gear stage sensor and the hydraulic pressure sensor; and
a solenoid valve configured to apply hydraulic pressure for learning the linearity error of the hydraulic pressure sensor to the hydraulic clutch based on a learning command of the controller, wherein when executing the predetermined program the controller is configured to:

generate the learning command for learning the linearity error of the hydraulic pressure sensor;

check a measured hydraulic pressure based on a voltage received from the hydraulic pressure sensor;

while generating the learning command corresponding to a first target hydraulic pressure between a first time point and a second time point at which a default period has passed from the first time point, check a first maximum value and a first minimum value of the measured hydraulic pressure between a third time point at which a transition period has passed from the first time point and the second time point;

compare a first difference value between the first maximum value and the first minimum value with a threshold value;

when the first difference value is greater than or equal to the threshold value, generate the learning command corresponding to the first target hydraulic pressure between the second time point and a fourth time point at which an extended period has passed from the second time point;

check a second maximum value and a second minimum value of the measured hydraulic pressure between the second time point and the fourth time point;

compare a second difference value between the second maximum value and the second minimum value with the threshold value;

when the second difference value is less than the threshold value, calculate a moving average value of an error value between the first target hydraulic pressure and the measured hydraulic pressure between the second time point and the fourth time point, and store the moving average value as a correction value for correcting the linearity error of the hydraulic pressure sensor.

* * * * *